(12) United States Patent
Vedage et al.

(10) Patent No.: US 9,546,243 B2
(45) Date of Patent: Jan. 17, 2017

(54) AMINES AND POLYMERIC PHENOLS AND USAGE THEREOF AS CURING AGENTS IN ONE COMPONENT EPOXY RESIN COMPOSITIONS

(71) Applicant: AIR PRODUCTS AND CHEMICALS, INC., Allentown, PA (US)

(72) Inventors: Gamini Ananda Vedage, Bethlehem, PA (US); Gauri Sankar Lal, Whitehall, PA (US); Stephen Michael Boyce, Bath, PA (US); Atteye Houssein Abdourazak, Allentown, PA (US); Dilipkumar Nandlal Shah, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/944,312

(22) Filed: Jul. 17, 2013

(65) Prior Publication Data
US 2015/0025201 A1 Jan. 22, 2015

(51) Int. Cl.
| C08G 59/62 | (2006.01) |
| C08G 59/50 | (2006.01) |
| C08L 63/00 | (2006.01) |
| C08K 5/17 | (2006.01) |
| C08K 5/3445 | (2006.01) |
| C08L 61/06 | (2006.01) |

(52) U.S. Cl.
CPC ............. *C08G 59/621* (2013.01); *C08G 59/50* (2013.01); *C08G 59/5033* (2013.01); *C08G 59/5073* (2013.01); *C08K 5/17* (2013.01); *C08K 5/3445* (2013.01); *C08L 61/06* (2013.01); *C08L 63/00* (2013.01); *C08L 2205/05* (2013.01)

(58) Field of Classification Search
CPC ........ C08L 61/06; C08L 61/14; C08G 59/621; C08G 59/5073; C08G 59/5033
USPC ...................................................... 525/534
See application file for complete search history.

(56) References Cited

U.S. PATENT DOCUMENTS

| 3,519,576 | A | | 7/1970 | Johnson | |
| 3,520,905 | A | | 7/1970 | Johnson | |
| 4,659,779 | A | * | 4/1987 | Bagga et al. | 525/118 |
| 4,689,390 | A | * | 8/1987 | Suzuki et al. | 528/118 |
| 4,866,133 | A | * | 9/1989 | Andrews et al. | 525/109 |
| 4,904,564 | A | * | 2/1990 | Chiong | 430/156 |
| 4,933,392 | A | * | 6/1990 | Andrews et al. | 525/110 |
| 4,977,214 | A | * | 12/1990 | Bagga | 525/109 |
| 6,441,064 | B1 | * | 8/2002 | Shah et al. | 523/421 |
| 6,462,164 | B1 | * | 10/2002 | Shah et al. | 528/89 |
| 7,226,976 | B2 | * | 6/2007 | Koto et al. | 525/218 |
| 7,910,667 | B1 | | 3/2011 | Vedage et al. | |
| 8,735,512 | B2 | * | 5/2014 | Walker et al. | 525/534 |
| 2010/0204410 | A1 | * | 8/2010 | Ogawa et al. | 525/395 |
| 2012/0077943 | A1 | | 3/2012 | Abdourazak et al. | |
| 2012/0250268 | A1 | * | 10/2012 | Ito et al. | 361/748 |
| 2013/0203898 | A1 | * | 8/2013 | Mueller-Cristadoro et al. | 523/466 |
| 2014/0256853 | A1 | * | 9/2014 | Walker et al. | 523/400 |

FOREIGN PATENT DOCUMENTS

| CN | 103025840 A | 4/2013 |
| JP | 60049025 A | 3/1985 |
| JP | 63117032 | 5/1988 |
| JP | 08073567 A | 3/1996 |
| JP | 11035661 A | 2/1999 |
| JP | 2008266541 A | 11/2008 |
| KR | 1020110028242 A | 3/2011 |
| KR | 1020120085257 | 7/2012 |
| WO | 2009089145 A1 | 7/2009 |
| WO | 2011045941 | 4/2011 |
| WO | 2012000171 A1 | 1/2012 |
| WO | 2012006001 A2 | 1/2012 |

OTHER PUBLICATIONS

Tanaka, "Synthesis and Characteristics of Epoxides," in C. A. May, ed., Epoxy Resins Chemistry and Technology (Marcel Dekker, 1988) pp. 9-55.

* cited by examiner

*Primary Examiner* — Mike M Dollinger
(74) *Attorney, Agent, or Firm* — Michael K. Boyer

(57) ABSTRACT

The disclosure relates to solving problems associated with conventional latent epoxy curing agents by providing a new class of latent epoxy curing agents. In particular, the disclosure relates to epoxy curing agents with improved storage stability and low use level (e.g., less than about 10 wt % relative to the epoxy compound) by forming solid solutions of certain classes of amines in polyphenolic resins.

24 Claims, No Drawings

AMINES AND POLYMERIC PHENOLS AND USAGE THEREOF AS CURING AGENTS IN ONE COMPONENT EPOXY RESIN COMPOSITIONS

BACKGROUND OF THE INVENTION

The instant invention relates to curing agents and accelerators for use in latent cured epoxy resin compositions.

Compositions comprising an epoxy resin and a curing agent (also known as a hardener) are known in the art. Many curing agents are reactive with the epoxy resin at room temperature and, therefore, are combined with the epoxy immediately prior to use. Others curing agents, known as latent hardeners, are stable in admixture with the epoxy resin at ambient temperature and effect hardening only when heated to elevated temperature.

U.S. Pat. Nos. 3,519,576 and 3,520,905 disclose using salts of monomeric polyhydric phenols with polyamines as latent curing agents for epoxy resins. U.S. Pat. No. 4,866,133 discloses using a solid solution of a polymeric polyhydric phenol with polyamines for curing epoxy resins. The disclosed polyamines contain at least two amine groups with at least one being a primary amine. U.S. Pat. No. 4,689,390 discloses a latent curing agent prepared by reacting a diamine bearing a tertiary amine and a primary or secondary amino group with a poly-epoxy compound and a phenolic resin or phenolic compounds. A solution of a polyamine adduct with bisphenolic A diglycidyl ether in poly-phenolic resins is described in US Pub No US 2012-0077943 A1. U.S. Pat. No. 7,910,667 discloses a polyphenolic resin solution of a polyurea derivative of a polyamine. WO 2012/000171 discloses heat activated tertiary amine catalysts for use with epoxy resins.

The disclosure of the previously identified patents and patent applications is hereby incorporated by reference.

There exists a need for a lower cost, more efficient latent epoxy curing agent. In particular, there is a need for latent epoxy curing agents which exhibit prolonged storage stability at ambient temperature and cure rapidly at greater than about 100° C. The methods and curing agents cited above suffer from several disadvantages which include high use level, too low cure temperature or precursor amines which are obtained by multi-step processes such as adduction with polyepoxides.

BRIEF SUMMARY OF THE INVENTION

The instant invention can solve problems associated with conventional latent epoxy curing agents by providing a new class of latent epoxy curing agents. In particular, the instant invention relates to epoxy curing agents with improved storage stability and low use level (e.g., less than about 10 wt % relative to the epoxy compound) by forming solid solutions of certain classes of amines in polyphenolic resins. By "solid solutions" it is meant a solid material into which is dissolved another substance that is accomplished by melting a solid and dissolving the other substance into it followed by cooling to obtain a solid material. The solid solution in accordance with the instant invention is then comminuted into particles. The particles can be comminuted by using any suitable process such as milling or grinding using conventional methods. Typically, the particles have a size ranging from about 2 to about 50 um, about 10 um to about 40 um and in some cases about 30 um to about 50 um wherein the particle size is determined by using an X-ray diffraction technology using conventional methods. In one aspect of the invention, the inventive curing agent comprises a latent curing agent that initiates curing at a temperature of greater than about 100 C (e.g., about 100 C to about 150 C, about 110 C to about 140 C and in some cases about 140 to about 150 C).

In another aspect of the invention, the heat of reaction (ΔH) for a composition comprising the inventive curing agent and an epoxy resin can range from about 250 J/g to about 490 J/g, about 300 J/g to about 350 J/g and in some cases about 350 J/g to about 400 J/g. Such compositions can have a glass transition temperature (Tg) that ranges from about 100 C to about 140 C, about 120 C to about 130 C and in some cases about 130 C to about 140 C.

In another aspect of the invention, epoxy compositions cured with the inventive curing agents can have a Lap Shear strength of about 1300 psi to about 2300 psi, about 1300 psi to about 2250 psi and in some cases about 1500 psi to about 2300 psi. These epoxy compositions can also have a T-Peel strength of about 9 pli to about 30 pli, about 9 pli to about 28 pli and in some cases about 15 pli to about 28 pli.

In a further aspect of the invention, the inventive curing agents are employed as an accelerator for curing with dicyanodiamide (DICY). The heat of reaction (ΔH) for a composition comprising the inventive curing agent (accelerator), DICY and an epoxy resin can range from about 250 J/g to about 490 J/g, about 300 J/g to about 350 J/g and in some cases about 350 J/g to about 400 J/g. Such compositions can have an onset or initiation temperature of about 100 C to about 150 C, about 110 C to about 140 C and in some cases about 140 C to about 150 CC, and a glass transition temperature (Tg) that ranges from about 100 C to about 140 C, about 120 C to about 130 C and in some cases about 130 C to about 140 C.

One aspect of the invention relates to a composition comprising at least one amine and at least one polyphenolic resin. In one aspect, the composition comprises at least one polyphenolic resin and at least one of:

(a) an amine of a general structure represented by:

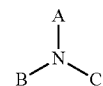

wherein A=an alkyl, aryl, arylalkyl or cycloaliphatic group bearing at least one tertiary amine group; B=an alkyl, aryl,arylalkyl or cycloaliphatic group of 1-20 carbon atoms or a substituted alkyl,substituted arylalkyl group or substituted cycloaliphatic group. The substituent may be at least one tertiary amine group; and wherein C=an alkyl, aryl, arylalkyl or cycloaliphatic group of 1-20 carbon atoms or a substituted alkyl, substituted arylalkyl group or substituted cycloaliphatic group; The substituent may be at least one tertiary amine group. and, (b) imidazole or substituted imidazoles represented by the general structure shown below:

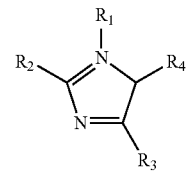

wherein $R_1$=alkyl or substituted alkyl groups of 1-20 carbon atoms and $R_2$, $R_3$, and $R_4$ may be alkyl or aryl groups of 1-20 carbon atoms.

One aspect of the invention relates to a composition comprising at least one amine and at least one resin wherein the polyphenolic resin comprises at least one phenolic novalak resin, phenol-Iformaldehyde and p-cresol-formaldehyde resins. In another aspect of the invention the polyphenolic resin is represented by the structure:

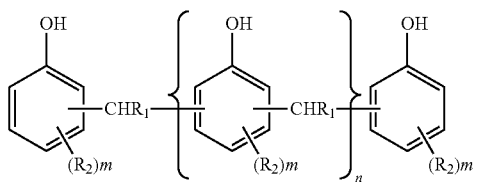

Wherein R1=H,alkyl or aryl, R2=an alkyl group of 1-10 carbon atoms, m=0-3, n=1-20.

In another aspect of the invention the inventive composition further comprises at least one epoxy resin.

In a further aspect of the invention the composition further comprises at least one DICY.

The various aspects of the invention can be used alone or in combination with each other.

DETAILED DESCRIPTION OF THE INVENTION

The instant invention can solve problems associated with conventional latent epoxy curing agents by providing a new class of latent epoxy curing agents. In particular, the instant invention relates to epoxy curing agents with improved storage stability and low use level (e.g., less than about 10 wt % relative to the epoxy compound) by forming solid solutions of certain classes of amines in polyphenolic resins. By "solid solutions" it is meant a solid material into which is dissolved another substance that is accomplished by melting a solid and dissolving the other substance into it followed by cooling to obtain a solid material. The solid solution in accordance with the instant invention is then comminuted into particles. The particles can be comminuted by using any suitable process such as milling or grinding using conventional methods. Typically, the particles have a size ranging from about 2 to about 50 um, about 10 um to about 40 um and in some cases about 30 um to about 50 um wherein the particle size is determined by using an X-ray diffraction technology using conventional methods. In one aspect of the invention, the inventive curing agent comprises a latent curing agent that initiates curing at a temperature of greater than about 100 C (e.g., about 100 C to about 150 C, about 110 C to about 140 C and in some cases about 140 to about 150 C).

In another aspect of the invention, the heat of reaction ($\Delta H$) for a composition comprising the inventive curing agent and an epoxy resin can range from about 250 J/g to about 490 J/g, about 300 J/g to about 350 J/g and in some cases about 350 J/g to about 400 J/g. Such compositions can have a glass transition temperature (Tg) that ranges from about 100 C to about 140 C, about 120 C to about 130 C and in some cases about 130 C to about 140 C.

In another aspect of the invention, epoxy compositions cured with the inventive curing agents can have a Lap Shear strength of about 1300 psi to about 2300 psi, about 1300 psi to about 2250 psi and in some cases about 1500 psi to about 2300 psi. These epoxy compositions can also have a T-Peel strength of about 9 pli to about 30 pli, about 9 pli to about 28 pli and in some cases about 15 pli to about 28 pli.

In a further aspect of the invention, the inventive curing agents are employed as an accelerator for curing with dicyanodiamide (DICY). The heat of reaction ($\Delta H$) for a composition comprising the inventive curing agent (accelerator), DICY and an epoxy resin can range from about 250 J/g to about 490 J/g, about 300 J/g to about 350 J/g and in some cases about 350 J/g to about 400 J/g. Such compositions can have an onset or initiation temperature of about 100 C to about 150 C, about 110 C to about 140 C and in some cases about 140 C to about 150 CC, and a glass transition temperature (Tg) that ranges from about 100 C to about 140 C, about 120 C to about 130 C and in some cases about 130 C to about 140 C.

One aspect of the invention relates to a composition comprising at least one amine and at least one polyphenolic resin. In one aspect, the composition comprises at least one polyphenolic resin and at least one of:

(a) an amine of a general structure represented by:

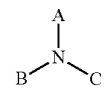

wherein A=an alkyl, aryl, arylalkyl or cycloaliphatic group bearing at least one tertiary amine group; B=an alkyl, aryl,arylalkyl or cycloaliphatic group of 1-20 carbon atoms or a substituted alkyl,substituted arylalkyl group or substituted cycloaliphatic group. The substituent may be at least one tertiary amine group; and wherein C=an alkyl, aryl, arylalkyl or cycloaliphatic group of 1-20 carbon atoms or a substituted alkyl, substituted arylalkyl group or substituted cycloaliphatic group; The substituent may be at least one tertiary amine group. and, (b) imidazole or substituted imidazoles represented by the general structure shown below:

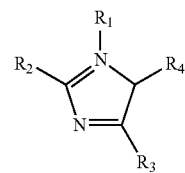

wherein $R_1$=alkyl or substituted alkyl groups of 1-20 carbon atoms and $R_2$, $R_3$, and $R_4$ may be alkyl or aryl groups of 1-20 carbon atoms.

One aspect of the invention relates to a composition comprising at least one amine and at least one resin wherein the polyphenolic resin comprises at least one phenolic novalak resin, phenol-Iformaldehyde and p-cresol-formaldehyde resins. In another aspect of the invention the polyphenolic resin is represented by the structure:

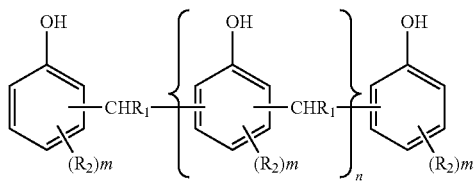

wherein R1=H,alkyl or aryl, R2=an alkyl group of 1-10 carbon atoms, m=0-3, n=1-20.

In another aspect of the invention the inventive composition further comprises at least one epoxy resin.

In a further aspect of the invention the composition further comprises at least one DICY.

The various aspects of the invention can be used alone or in combination with each other.

DETAILED DESCRIPTION

The instant invention relates to solid solutions of certain classes of amines in polyphenolic resins and combinations of the solid solutions with epoxy resins. While any suitable amine (and combinations thereof) can be employed, examples of suitable amines are:

(a) An amine of a general structure represented by:

Wherein A=an alkyl, aryl, arylalkyl or cycloaliphatic group bearing at least one tertiary amine group.
B=an alkyl, aryl,arylalkyl or cycloaliphatic group of 1-20 carbon atoms or a substituted alkyl, substituted arylalkyl group or substituted cycloaliphatic group. The substituent on these groups may be at least one tertiary amino group. Wherein C=an alkyl, aryl, arylalkyl or cycloaliphatic group of 1-20 carbon atoms or a substituted alkyl,substituted arylalkyl group or substituted cycloaliphatic group. The substituent on these groups may be at least one tertiary amino group The groups A, B, and C may be linked together to form monocyclic, bicyclic or polycyclic fused-ring structures. A, B, and C may be polyethylene oxide or poly propylene oxide with <20 EO or PO units and typically about 10 to about 15, and about 10 to about 2 EO or PO units.

(b) Imidazole or substituted imidazoles represented by the general structure shown below:

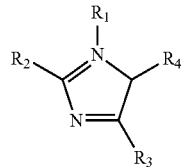

Wherein $R_1$=alkyl or substituted alkyl groups of 1-20 carbon atoms.
Substituent on the alkyl group may include heteroatoms such as O or N which may be further substituted with H or alkyl groups to form hydroxyl, alkoxy or aminoalkyl-substituted imidazoles. $R_2$, $R_3$, and $R_4$ may be alkyl or aryl groups of 1-20 carbon atoms.

Examples of amines of this invention comprise at least one member selected from the group consisting of benzyl dimethylamine, 2,4,6-tris(dimethylamino)phenol, 1,8-Diazabicyclo(5.4.0)undec-7-ene (DBU), 3,3',3"-Iminotris(N,N-dimethylpropylamine), 1-(3-aminopropyl)imidazole, 2-methylimidazole, 2-ethyl-4-methylimidazole, and combinations thereof.

The amines of this invention can be produced by any suitable method. An example of a suitable method comprises the reductive alkylation of the corresponding primary amine with an aldehyde or ketone with $H_2$ and a catalyst (e.g., Pd).

The polyphenolic resins that can be used to form solutions with above amines are:

(a) Phenolic novolak resins which can be prepared from mononuclear phenols and alkyl substituted mononuclear phenols and an aldehyde such as acetaldehyde, benzaldehyde or preferably formaldehyde. The chemical structure of such phenolic novolak resins is represented below:

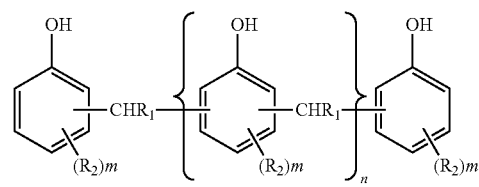

Wherein R1=H,alkyl or aryl, R2=an alkyl group of 1-10 carbon atoms, m=0-3, n=1-20. Examples of useful novolak resins comprise phenol-lformaldehyde and p-cresol-formaldehyde resins. Other suitable phenolic resins comprise polynuclear phenols such as a bisphenol and an aldehyde such as formaldehyde, acetaldehyde, benzaldehyde and furfuraldehyde. Suitable bisphenols can comprise at least one member selected from the group consisting of bis(4-hydroxyphenyl) methane, 4,4'-hydroxydiphenyl, bis(4-hydroxyphenyl) sulphone, 4,4'-dihydroxy-benzophenone and 2,2-bis(4-hydroxyphenyl)propane (bisphenol A) and combinations thereof.

(b) Polymers or co-polymers of phenols substituted by an unsaturated ethylene group such as 2-allylphenol, 4-allylphenol or polymers and copolymers of phenol substituted acrylates or phenol substituted methacrylates or polymers of vinylphenols and propenylphenols. Suitable phenolic resins also comprise co-polymers of such unsaturated phenols with other polymerizable alkene-substituted compounds such as styrene, ⌐-methylstyrene, acrylic esters, methacrylic esters and vinyl esters.

Phenolic resins of this invention can be produced by using any suitable method. An example of a suitable method comprises the reaction of phenols with formaldehyde. Novolacs are phenol-formaldehyde resins with a formaldehyde to phenol molar ratio of less than one. The polymerization is brought to completion using acid-catalysis such as oxalic acid, hydrochloric acid or sulfonate acids. The phenol units are mainly linked by methylene and/or ether groups The amines and phenolic resins can be combined by any suitable method. An example of a suitable method comprises as follows: The amine is added to a 2-piece glass reaction of flask of 250 mL volume under a $N_2$ atmosphere and heated to 145-180° C. using a heating mantle. The phenolic resin is slowly added while stirring with an overhead mechanical stirrer. On completion of addition the mixture is held at 180° C. for an additional period of 1 h. The molten solution is poured on to a Teflon® block or aluminium sheet and allowed to cool to room temperature. The weight ratio of amine to phenolic resin can range from about 1:1 to about 1:5, about 1:1.39 to about 1:1.42 and in some cases about 1:1.39 to about 1:1.28.

The solid solution of the amines and phenolic resins describe above can be used as curing agents for epoxy resins. Suitable epoxy resins are described below:

Epoxy resins commercially available under the trade name DER 383 (available from Dow) and EPON 826 (available from Hexion Specialty Chemicals) are suitable for this application.

Other epoxy resins may include, but are not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., Epoxy Resins Chemistry and Technology (Marcel Dekker, 1988), Pages 9-55, which is incorporated herein by reference.

One class of epoxy resins suitable for use in the present disclosure comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the following structure also are useful in the present disclosure:

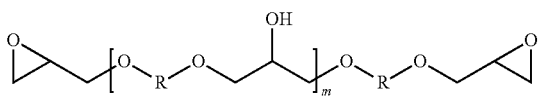

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy component may be a cycloaliphatic (alicyclic) epoxide. Examples of suitable cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methyl-cyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in WO 2009/089145 A1, which is hereby incorporated by reference.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexyl methyl methyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3,4-epoxycyclohexane carboxylates are described, for example, in U.S. Pat. No. 2,890,194; which is hereby incorporated by reference. In other embodiments, the epoxy component may include polyol polyglycidyl ether from polyethylene glycol, polypropylene glycol or polytetrahydrofuran or combinations thereof.

The ratio of a solid solution (curing agent) to epoxy resin can range from about 2:100 to about 10:100, about 5:100 to about 10:100 and in some cases about 5:100 to about 8:100. The solid solution and epoxy resin can be combined by using any suitable method. An example of a suitable method comprises manually mixing the curing agent with the resin in a suitable glass, stainless steel or aluminum vessel with a spatula or by a mechanical mixer.

The inventive curing agent can also be employed as an accelerator when using DICY to cure the foregoing epoxy resins. The inventive curing agent (accelerator) can be combined with DICY by using any suitable method such as manually mixing the curing agent with the resin in a suitable glass, stainless steel or aluminum vessel with a spatula or by a mechanical mixer. The ratio of inventive curing agent (accelerator) to DICY can range from about 1:10 to about 6:10, about 2:6 to about 2:8 and in some cases about 2:6 to about 2:10. The DICY/accelerator can be combined with an epoxy by using any suitable method such as manually mixing the curing agent with the resin in a suitable glass, stainless steel or aluminum vessel with a spatula or by a mechanical mixer. The ratio of DICY/accelerator can range from about 11:100 to about 16:100, about 8:100 to about 10:100 and in some cases about 8:100 to about 12:100.

Optionally co-accelerators such as modified amines (e.g., which are available commercially from Air Products as Ancamine® 2014, Ancamine® 2337, Ancamine 2442® amine); tertiary amines (e.g., which are available commercially as Ancamine® K.54, Ancamine® 1110 amines), and BDMA can be combined with the compositions of the subject invention. In addition, the inventive composition can comprise non-reactive diluents and plasticizers, impact modifiers, inorganic fillers such as silica, talc, calcium carbonate; and solvents such as glycol ethers, ketones, DMF and other such organic solvents. The amount of the foregoing additives can range from about 1 to about 10, about 2 to about 10 and about 5 to about 10 wt. percentage of the composition.

Certain aspects of the invention are illustrated by the following Examples. Such Examples shall not limit the scope of the appended claims.

EXAMPLES

Example 1

Preparation of Amine Solution in Poly Phenolic Resins

The amine was added to a 2-piece 500 mL glass flask under a N₂ atmosphere and heated to 145-180° C. using a heating mantle. The phenolic resin (PN-320) was slowly added while stirring with a mechanical stirrer. On completion of addition the mixture was held at 180° C. for an additional period of 1 h. The molten solution was poured on to a Teflon® block or an aluminum sheet and allowed to cool to room temperature. The cooled solid product was ground by a coffee grinder or jet mill to a particulate having a range of about 2 to about 50 um. This method was used to prepare the following solutions of amines.

(a) 1,3-Aminopropyl imidazole solution in polyphenolic resin (PN 320)

Weight ratios of amine to polyphenolic resins of 180/250, 180/500 and 180/750 were prepared as follows:

Prepared as above using (i) 37.18 g 1,3-Aminopropyl imidazole and 103.69 g of polyphenolic resin (PN 320), (ii) 38.39 g 1,3-Aminopropyl imidazole and 53.50 g of polyphenolic resin (PN320), and (iii) 30.41 g 1,3-Aminopropyl imidazole and 126.99g of polyphenolic resin (PN320).

(b) Benzyl dimethylamine solution in polyphenolic resin (PN 320)

Weight ratios of amine to polyphenolic resins of 180/250, 180/500 and 180/750 were prepared as follows:

Prepared using (i) 37.92 g of Benzyl dimethylamine and 105.94 g of polyphenolic resin (PN 320), (ii) 54.55 g Benzyl dimethylamine and 75.88 g of polyphenolic resin (PN320), and (iii) 30.01 g Benzyl dimethylamine and 125.38 g of polyphenolic resin (PN320).

(c) 2-methylimidazole solution in polyphenolic resin (PN 320)

Weight ratios of amine to polyphenolic resins of 180/250, 180/500 and 180/750 were prepared as follows:

Prepared using (i) 37.22 g of 2-methylimidazole and 50.54 g of polyphenolic resin (PN 320), (ii) 43.94 g of 2-methylimidazole and 122.07 g of polyphenolic resin (PN320), and (iii) 30.03 g of 2-methylimidazole and 125.20 g of polyphenolic resin (PN320).

(d) 1,8-Diazabicyclo(5.4.0)undec-7-ene (DBU) solution in polyphenolic resin (PN 320).

Weight ratios of amine to polyphenolic resins of 180/350 and 180/500 were prepared as follows:

Prepared using (i) 36.15 g of DBU and 70.29 g of polyphenolic resin (PN 320), and (ii) 36.18 g of DBU and 100.16 g of polyphenolic resin (PN320)

(e) 2,4,6-Tris(dimethylamino)phenol solution in polyphenolic resin (PN 320)

Prepared using a weight ratio of amine to polyphenolic resin of 1:1.as follows:

Prepared using 100 g g of 2,4,6-tris(dimethylamino)phenol and 100 g of polyphenolic resin (PN 320).

(f) 3,3',3"-Iminotris(N,N-dimethylpropylamine), solution polyphenolic resin (PN 320)

Weight ratios of amine to polyphenolic resins of 180/250, 180/500 and 180/750 were prepared as follows:

Prepared using (i) 36.17 g of 3,3',3"-Iminotris(N,N-dimethylpropylamine), and 70.61 g of polyphenolic resin (PN 320), (ii) 3,3',3"-Iminotris(N,N-dimethylpropylamine) 37.56 g and 104.59 g of polyphenolic resin (PN320), and (iii) 24.90 g of 3,3',3"-Iminotris(N,N-dimethylpropylamine) and 103.99 g of polyphenolic resin (PN320).

(g) 2-Ethyl-4-methylimidazole solution in polyphenolic resin (PN 320)

Prepared using a weight ratio of amine to polyphenolic resins of 180/500 as in Example 1a.

Example 2

Differential Scanning Calorimetry (DSC) of Amine Solutions in Polyphenolic Resins (A) Sole-Cure Samples of the amine solutions prepared in accordance with Example 1 were intimately mixed with bisphenol A diglycidyl ether (10:100 mass ratio) and analyzed by DSC (TA instruments QA20) to determine the onset cure temperature, heat of reaction ($\Delta H$) and glass transition temperature (Tg). The DSC was operated in accordance with standard methods using software included in the DSC. The results are shown in the table below:

| Curing agent (10 phr) | Onset Temperature ° C. | $\Delta H$ (J/g) | $T_g$ |
|---|---|---|---|
| 2-Methylimidazole | 115 | 350 | none |
| 2-Ethyl-4-methylimidazole | 110 | 420 | 118 |
| 1,3-Aminopropyl imidazole/polyphenolic resin (180/500) | 120 | 292 | 126 |
| 2-Ethyl-4-methylimidazole/ polyphenolic resin (180/500) | 110 | 383 | 140 |
| 2-Methylimidazole/ polyphenolic resin (180/500) | 110 | 333 | 141 |

(B) Amine/Phenol Solid Solutions as DICY Accelerator

Samples of the amine solutions of Example 1 were mixed with dicyanodiamide (DICY) and bisphenol A diglycigyl ether (2:6:100 mass ratio) by using a mechanical stirrer in a 250 mL glass flask. The mixtures were analyzed by DSC, in the manner described above, to determine the onset cure temperature, heat of reaction ($\Delta H$) and glass transition temperature (Tg). The results are shown in the table below:

| Curing agent/DICY (2/6 phr) | Onset temperature (° C.) | $\Delta H$ (J/g) | $T_g$ |
|---|---|---|---|
| 2-Methylimidazole | 100 | 487 | 123 |
| 2-Methylimidazole/ polyphenolic resin (180/500) | 117 | 448 | 129 |
| DBU/polyphenolic resin (180/500) | 125 | 274 | 127 |
| Benzyl dimethylamine/ polyphenolic resin (180/500) | 124 | 349 | 125 |
| 1,3-Aminopropyl imidazole/ polyphenolic resin (180/500) | 124 | 380 | 127 |
| 2,4,6-Tris(dimethylamino)phenol/ polyphenolic resin (1:1) | 133 | 274 | 124 |

Example 3

Latency of Amine Solutions in Polyphenolic Resin (PN 320) in Epoxy Resin

The latency of the amine/polyphenolic resin solutions made in accordance with Example 1 was monitored by a Brookfield Cone and Plate viscometer (model HADV II+CP) with a #52 spindle at 25° C. using 0.5 mL sample. Also shelf stability was determined by visual observation to determine gelation time. The results are shown in the table below:

| Sole Cure(amine/bisphenol A diglycidyl ether (10/100)) | |
| --- | --- |
| Curing agent (10 phr) | Shelf stability (Time at 25° C.) |
| 2-Methylimidazole | 4 h |
| 2-Ethyl-4-methylimidazole | 10 h |
| 1,3-Aminopropyl imidazole/ polyphenolic resin (180/500) | >90 days |
| 2-Ethyl-4-methylimidazole/ polyphenolic resin (180/500) | 7 days |
| 2-Methylimidazole/ polyphenolic resin (180/500) | 7 days |

| Amine/DICY/bisphenol A diglycidyl ether (2/6/100) | |
| --- | --- |
| Curing agent/DICY (2/6 phr) | Shelf stability (Time at 25° C.) |
| 2-Methylimidazole | 4 h |
| 2-Methylimidazole/polyphenolic resin (180/500) | 7 days |
| DBU/polyphenolic resin (180/500) | >60 days |
| Benzyl dimethylamine/polyphenolic resin (180/500) | 60 days |
| 1,3-Aminopropyl imidazole/ polyphenolic resin (180/500) | >120 days |
| Tris(3-dimethylamino/ polyphenolic resin (1:1) | >90 days |

Example 4

Adhesion Properties

The adhesion properties of epoxy resin compositions curing with the amine/polyphenolic resin curing agents, made in accordance Example 1, were measured by the Lap Shear and T-Peel techniques. The Lap shear measurements were conducted on an Instron Model 1125 instrument according to the Lap Shear ASTM method D1876 with at least five replicates. The test materials were applied to a 1"×04"×0.32" cold rolled steel panel (ACT Cold Roll Steel 01×04×032 B952 P60 DIW: Unpolished). The materials were applied with 10 mil glass beads (1% based on formulation weight) to ½' ends of the coupon. Another coupon was laid on top overlapping the ½' bands on the other coupon. The panels with test materials were cured in an oven for 15-20 min at 150° C. or 177° C. before measurement.

The T-peel measurement was conducted on an Instron Model 1125 instrument according to the Lap Shear ASTM method D1876 with at least five replicates. The test materials were applied to a 1"×4"×0.32" cold rolled steel panel (ACT Cold Roll Steel 01×04×032 B952 P60 DIW: Unpolished) pre-bent at right angle at ⅞" from the end, leaving 3⅛"×1" surface.). The materials were applied with 10 mil glass beads (1% based on formulation weight) by using a stainless steel spatula. The test materials were cured for 15-20 min at 150° C. or 177° C. in an oven before measurement. The results of the Lap Shear and T-Peel measurements are shown in the table below:

| Curing agent | Lap Shear (psi) | T-Peel (pli) |
| --- | --- | --- |
| 2-Methylimidazole | 1860 | 9.3 |
| 2-Methylimidazole/polyphenolic resin (180/500) | 2238 | 10.8 |
| Benzyl dimethylamine/polyphenolic resin (180/500) | 2067 | 28 |
| 1,3-Aminopropyl imidazole solution/polyphenolic resin (180/500) | 1317 | 23.7 |
| 2-Ethyl-4-methylimidazole solution/polyphenolic resin (180/500) | 2114 | 11.7 |
| DBU/polyphenolic resin (180/500 | 688 | 23 |

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular aspect or embodiment disclosed as the best mode contemplated for carrying out this invention, but that the invention will include all embodiments falling within the scope of the appended claims including using the aspects or embodiments of the invention alone or in combination with each other.

The invention claimed is:

1. A composition comprising dicyandimide, and a solid solution of at least one polyphenolic resin and at least one imidazole or substituted imidazoles represented by the general structure shown below:

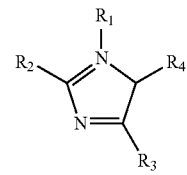

wherein $R_1$=amino alkyl substituted groups of 1-20 carbon atoms and $R_2$, $R_3$, and $R_4$ may be alkyl or aryl groups of 1-20 carbon atoms; wherein the polyphenolic resin comprises at least one phenol formaldehyde resin and wherein the solid solution has a particle size of about 2 to about 50 um.

2. The composition of claim 1 comprising 1,3-aminopropyl imidazole and polyphenolic resin.

3. The composition of claim 1 comprising 2-methylimidazole and polyphenolic resin.

4. The composition of claim 1 comprising 1,8-Diazabicyclo(5.4.0)undec-7-ene (DBU) and polyphenolic resin.

5. The composition of claim 1 comprising 2,4,6-Tris(dimethylamino)phenol and polyphenolic resin.

6. The composition of claim 1 comprising 2-Ethyl-4-methylimidazole and polyphenolic resin.

7. The composition of claim 1 wherein the polyphenolic resin comprises p-cresol-formaldehyde resins.

8. The composition of claim 1 wherein the polyphenolic resin is represented by the structure:

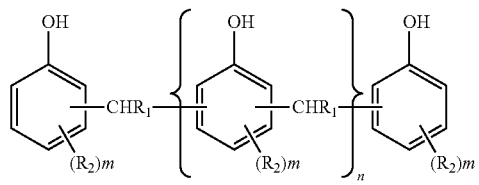

Wherein R1=H, alkyl or aryl, R2=an alkyl group of 1-10 carbon atoms, m=0-3, n=1-20.

9. The composition of claim 1 further comprising at least one epoxy resin and wherein the solid solution initiates curing of the epoxy resin at a temperature of about 110 to about 140C.

10. The composition of claim 1 further comprising at least one amine of a general structure represented by:

Wherein A=an alkyl, aryl, arylalkyl or cycloaliphatic group bearing at least one tertiary amine group; B=an alkyl, aryl, arylalkyl or cycloaliphatic group of 1-20 carbon atoms or a substituted alkyl, substituted arylalkyl group or substituted cycloaliphatic group; and wherein C=an alkyl, aryl, arylalkyl or cycloaliphatic group of 1-20 carbon atoms or a subsituted alkyl, substituted arylalkyl group or substituted cycloaliphatic group.

11. The composition of claim 10 wherein groups A, B, and C are linked together to form monocyclic, bicyclic or polycyclic fused-ring structures.

12. The composition of claim 10 wherein groups A, B, and C are polyethylene oxide or poly propylene oxide with greater than 0 and less than 20 EO or PO units.

13. The composition of claim 10 wherein the amine comprises Benzyl dimethylamine.

14. The composition of claim 10 wherein the amine comprises 3,3',3''-Iminotris(N,N-dimethylpropylamine).

15. The composition of claim 10 wherein at least one of B and C comprises a tertiary amine group.

16. A composition consisting essentially of dicyandimide, and a solid solution of at least one polyphenolic resin and at least one imidazole or substituted imidazoles represented by the general structure shown below:

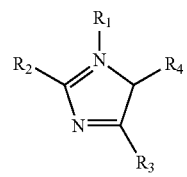

wherein $R_1$=amino alkyl substituted groups of 1-20 carbon atoms and $R_2$, $R_3$, and $R_4$ may be alkyl or aryl groups of 1-20 carbon atoms.

17. The composition of claim 16 wherein the polyphenolic resin comprises phenol-formaldehyde.

18. The composition of claim 16 wherein the polyphenolic resin is represented by the structure:

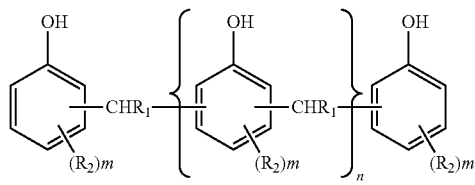

wherein R1=H, alkyl or aryl, R2=an alkyl group of 1-10 carbon atoms, m=0-3, n=1-20.

19. A composition comprising at least one epoxy resin, dicyandimide, and a solid solution comprising at least one polyphenolic resin and at least one-imidazole or substituted imidazoles represented by the general structure shown below:

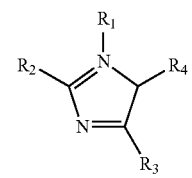

wherein $R_1$=amino alkyl substituted groups of 1-20 carbon atoms and $R_2$, $R_3$, and $R_4$ may be alkyl or aryl groups of 1-20 carbon atoms; and wherein the polyphenolic resin is represented by the structure:

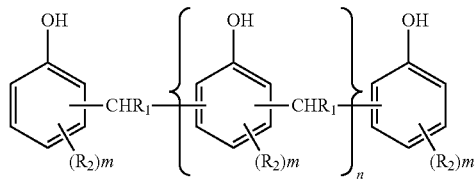

wherein R1=H, alkyl or aryl, R2=an alkyl group of 1-10 carbon atoms, m=0-3, n=1-20 and wherein the solid solution has a particle size of about 2 to about 50 um.

20. The composition of claim 19 wherein the ratio of solid solution to dicyandimide is about 1:10 to about 6:10.

21. The composition of claim 20 wherein the ratio of amine to phenolic resin is about 1:1 to about 1:5.

22. The composition of claim 19 wherein composition has a curing initiation temperature of about 100 to about 150 C, and a heat of reaction of about 250 to about 490 J/g.

23. The composition of claim 19 wherein the polyphenolic resin comprises at least one member selected from the group consisting of formaldehyde, acetaldehyde, benzaldehyde, furfuraldehyde, bis(4-hydroxyphenyl)methane, 4,4'-hydroxydiphenyl, bis(4-hydroxyphenyl)sulphone, 4,4'-dihydroxy-benzophenone and 2,2-bis(4-hydroxyphenyl)propane (bisphenol A) and combinations thereof.

24. The composition of claim 19 wherein the polyphenolic resin comprises at least one member selected from the group consisting of 2-allylphenol, 4-allylphenol or polymers; copolymers of phenol substituted acrylates or phenol substituted methacrylates or polymers of vinylphenols and propenylphenols; co-polymers of unsaturated phenols with other polymerizable alkene-substituted compounds.

* * * * *